United States Patent [19]
Hohlbaum

[11] 4,260,586
[45] Apr. 7, 1981

[54] APPARATUS FOR CONTACTING LIQUIDS

[75] Inventor: Theodor J. M. Hohlbaum, Ilford, England

[73] Assignee: RTL Contactor Holding S.A., Zug, Switzerland

[21] Appl. No.: 962,969

[22] Filed: Nov. 22, 1978

[51] Int. Cl.$^3$ .............................................. B01D 11/04
[52] U.S. Cl. ................................................... 422/269
[58] Field of Search ............... 422/135, 224, 258, 259, 422/269, 271

[56] References Cited
U.S. PATENT DOCUMENTS

| | | | |
|---|---|---|---|
| 2,106,366 | 1/1938 | Tijmstra | 422/258 X |
| 2,234,921 | 3/1941 | Webb | 422/258 X |
| 2,626,889 | 1/1953 | Carney | 422/259 X |
| 2,941,872 | 6/1960 | Pilo et al. | 422/259 |
| 3,526,484 | 9/1970 | Kilpatrick | 422/135 |

Primary Examiner—William A. Cuchlinski, Jr.
Attorney, Agent, or Firm—Bernard & Brown

[57] ABSTRACT

Apparatus for contacting immiscible or partly miscible liquids, for example in an extraction process in the form of a container through which the liquids flow having a plurality of discs arranged to rotate and dividing the container into connected compartments, a ring of foraminous material, capable of receiving and temporarily storing liquid, being arranged between at least one pair of discs, so that, in use, liquid is carried from one phase and shed in the other phase.

6 Claims, 2 Drawing Figures

U.S. Patent  Apr. 7. 1981  4,260,586

4,260,586

APPARATUS FOR CONTACTING LIQUIDS

BACKGROUND OF THE INVENTION

This invention relates to apparatus for contacting immiscible or partly miscible liquids, for example for the purpose of extracting a material contained in one of the liquids and transferring it as completely as possible to the other liquid.

Such apparatus has been described in British Pat. Specifications Nos. 972035 and 1037573 and copending Application No. 23633/78. The apparatus of Specification No. 972035 consists of a container through which the liquids can flow in countercurrent in a substantially horizontal direction, and a rotor mounted within the container and having a number of rotor discs spaced apart axially with a gap between the edge of each disc and the interior surface of the container, so as to produce a series of connected compartments, and receptacles for liquid arranged between the discs. As the rotor turns, the buckets transfer liquid from one phase and discharge the liquid into the other phase, through which the discharged liquid passes back to the first phase.

OBJECTS OF THE INVENTION

It is an object of the invention to provide improved apparatus for contacting immiscible or partly miscible liquids.

It is further object of the invention to provide apparatus for extracting a material contained in one of two immiscible or partly miscible liquids and transferring it as completely as possible to the other liquid.

These and other objects of the invention will appear from the following description.

One aspect of the present invention resides in apparatus for contacting immiscible or partly miscible liquids comprising a container into which the liquids can be supplied and withdrawn as separate phases and through which the liquids can flow, a plurality of discs within the container which divide the container into a series of connected compartments, the discs being mounted for rotation within the container or for rotation with the container, and in each of at least some of the compartments a ring of foraminous material between the discs forming the compartment, the foraminous material being capable of receiving, and temporarily storing, liquid so that, as the discs rotate, liquid is carried from one phase and is shed in the other phase.

SUMMARY OF THE INVENTION

Figure 1:
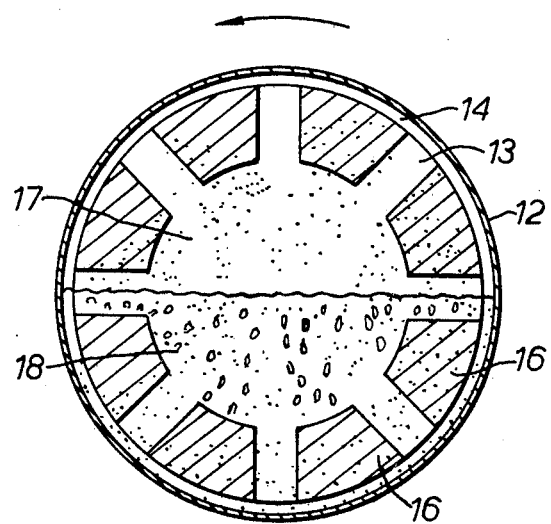
FIG. 1 is a radial section through one embodiment of contactor in accordance with the invention.

The ring of foraminous material, which is disposed adjacent the periphery of the discs, may be either a continuous ring or an interrupted ring.

The formanous material can be any material with connected liquid-receiving cells; examples are expanded metals and plastics, laced, meshed, woven, knitted, or matted threads or filaments of metals, plastics or natural materials, wire brushes or brushes made of natural or plastics bristles. Obviously, the material employed for the ring, should not be subject to chemical attack by the liquids being treated.

Preferably, each compartment within the container has a ring of the foraminous material, although in some applications alternate compartments have and do not have rings of foraminous material. Usually, the liquids enter the container at opposite ends and flow through the compartments; in each compartment having the foraminous material, the liquids are contacted by the rings which carry the heavier phase up into the light phase, and the lighter phase down into the heavier, the liquid of one phase being displaced progressively by the other phase, as it is carried through that other phase. As a result, streams of each liquid are caused to flow through the other liquid.

The foraminous material may be preferentially wetted by one of the liquids with the consequence that, while that liquid is carried and released into the other liquid, that other liquid is taken into the first liquid to a minor extent, if at all. The material in some of the compartments may then be preferentially wetted by a first of the liquids, while the material in other compartments may be preferentially wetted by the second of the liquids. Alternatively, where the ring is interrupted and formed of a number of segmental elements, some of the elements may be made of a material which is preferentially wetted by a first of the liquids and other elements in the same compartment may be made of another material which is peferentially wetted by the second of the liquids.

The invention wll be more readily understood by way of example, from the following description of liquid/liquid contactors in accordance therewith, reference being made to the accompanying drawing.

The contactors are generally as described in British patent Specificaton No. 972035 and each consists of an outer, cylindrical, stationary, container or shell 12, within which is mounted a rotor consisting of a shaft carrying a series of spaced discs, one of which is shown at 13 and which divide the interior of the container 12 into a series of axially spaced compartments. The edge of each disc is spaced from the container 12 so as to form a narrow annular gap 14 through which the liquids can pass from one compartment to another. The container 12 has end plates and inlets and outlets for the two liquids so that those liquids pass through the container in countercurrent. The rotor may be carried by a shaft or by stub shafts mounted in bearings in the end plates with driving means at one end.

Figure 2:
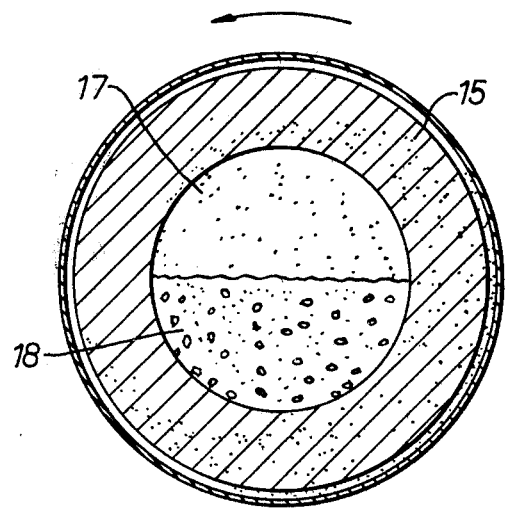
FIG. 2 is a radial section through a second embodiment of contactor in accordance with the invention.

Instead of the buckets or receptacles described in Specification No. 972035 each compartment, except possibly those compartments where a component is removed from the contactor, is provided with a ring of foraminous material, which may be made of any of the material described above. The ring of foraminous material in each compartment extends from one disc to the other disc of that compartment. The ring may be continuous, as shown in FIG. 2 at 15, or may be interrupted as shown in FIG. 1, the ring then consisting of a series of spaced segments 16. The thickness of the ring in the radial direction is about one quarter of that of the internal diameter of the container 12. That diameter may be from a few inches in the case of laboratory apparatus to several feet in the case of industrial contactors.

In operation, the two liquids are fed into the contactor from opposite ends and, having different specific gravities, form two phases 17, 18, the interface of which is approximately at the central horizontal diameter of the container 12. As the rotor turns, liquid 18 of the heavier phase is received in the ring and is carried up into the lighter phase 17 where it is progressively displaced by liquid of the lighter phase. The displaced heavier liquids then fall in droplets through the lighter phase and regains the heavier phase 18. Similarly, displacing liquid of the lighter phase is carried by the ring into the heavier phase 18 and is released to pass through the heavier phase back into the lighter phase.

The speed of rotation of the rotor is dependent on the size of the apparatus and the property of the two liquids. It should not be so high as to result in entrainment of either liquid in the other liquid leaving the contactor. The gap 14 should be such as to produce a velocity of liquid flow sufficiently high to minimize back mixing, i.e. the passage of a liquid from one compartment to the next in the direction opposite to the general direction of flow of that liquid through the contactor. On the other hand, the velocity of liquid flow should not be so high as to cause an inconveniently high pressure drop. A velocity of about 0.5 to 1 cm/sec has been found suitable for laboratory models.

It is not necessary that each and every one of the compartments shall contain the ring of foraminous material. Thus, for example, only every second compartment may contain the material, intermediate compartments being devoid of foraminous material. Such an arrangement is used where, for example, a reagent is introduced at spaced points along the axial length of the contactor.

In the description above, the foraminous material used for the rings are equally, or nearly equally, wetted by the two liquids. Instead, material which is preferentially wetted by one or other of the liquids may be employed. In one example of the use of preferentially wetted material, every second compartment of the contactor have continuous or interrupted rings of a first foraminous material which is preferentially wetted by a first of the liquids, while intermediate compartments have similar rings of a second foraminous material which is preferentially wetted by the second of the liquids. Then, in the compartments having the first material, the first liquid is carried into and mingled with the second liquid without any great quantity of the second liquid being carried into the first liquid, and in the other compartments the second liquid is carried into and intermingled with the first liquid without substantial movement of the first liquid into the second liquid.

In another, example, the rings are as illustrated in FIG. 1 and alternate segments are made of the first and the second preferentially wetted materials. Each liquid is then carried into the other liquid in each compartment.

We claim:

1. Apparatus for contacting immiscible or partly miscible liquids, comprising:
   a container through which the liquids can flow substantially with the lighter phase above the heavier phase;
   means for supplying to and withdrawing from the container the liquids as separate phases;
   a plurality of discs within the container dividing the container into a series of connected compartments, the discs being mounted for rotation with, or rotation within the container; and
   an interrupted ring of foraminous material, in each of at least some of the compartments and arranged for rotation therewith, the foraminous material being capable of receiving and temporarily storing liquid, whereby as the discs rotate, liquid is carried from one phase and is shed in the other phase.

2. Apparatus according to claim 1, wherein the ring of foraminous material is disposed adjacent the periphery of the discs.

3. Apparatus according to claim 1, in which alternate compartments contain and do not contain foraminous material.

4. Apparatus according to claim 1, in which the interrupted ring is constituted by a plurality of segments, some of which are made of a material which is preferentially wetted by one of the liquids, and the remainder of which are made of material which is preferentially wetted by the other of the liquids.

5. Apparatus according to claim 1, wherein the foraminous material is selected from expanded metals, expanded plastics laced, meshed, woven, knitted, or matted threads or filaments of metals, plastics or natural materials, wire brushes or brushes of natural or plastics bristles.

6. Apparatus according to claim 1, wherein the interrupted ring is disposed adjacent the periphery of the discs and is constituted by a plurality of segments, some of which are made of a material which is preferentially wetted by one of the liquids, and the remainder of which are made of a material which is preferentially wetted by the other of the liquids, the foraminous material being selected from expanded metals, expanded plastics, laced, meshed, woven, knitted, or matted threads or filaments of metals, plastics or natural materials, wire brushes of natural or plastics bristles.

* * * * *

UNITED STATES PATENT AND TRADEMARK OFFICE
CERTIFICATE OF CORRECTION

PATENT NO. : 4,260,586
DATED : April 7, 1981
INVENTOR(S) : Theodor J. M. Hohlbaum It is certified that error appears in the above—identified patent and that said Letters Patent is hereby corrected as shown below:

Column 1, line 59, "formanous" should be "foraminous".

Column 1, line 29, "a" should be inserted between "is" and "further".

Column 2, line 26, "peferentially" should be "preferentially".

Signed and Sealed this

Twenty-fifth Day of August 1981

[SEAL]

Attest:

Attesting Officer

GERALD J. MOSSINGHOFF

Commissioner of Patents and Trademarks